Dec. 16, 1930.  J. V. PACHER  1,785,094
FUEL SUPPLY APPARATUS
Filed March 22, 1930
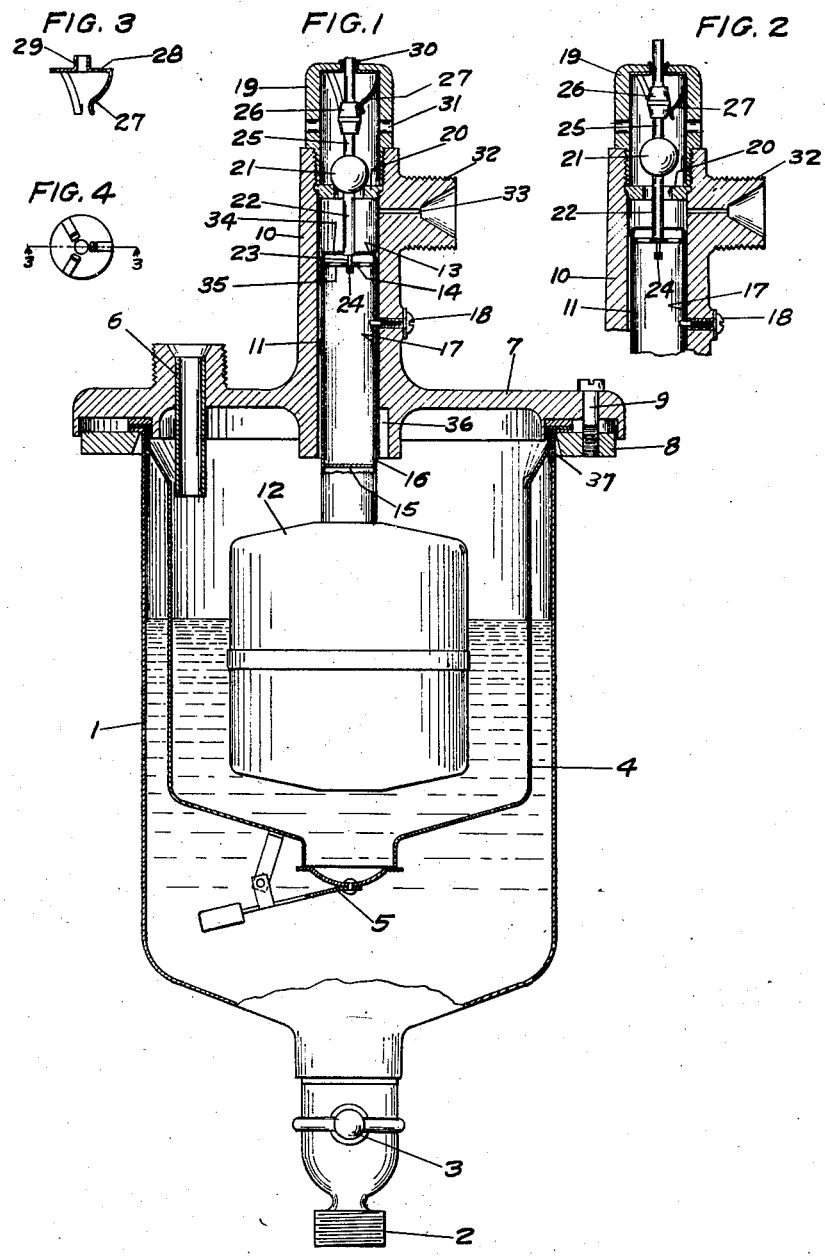
INVENTOR
JOSEF V. PACHER
BY
A. D. T. Libby
ATTORNEY Patented Dec. 16, 1930

1,785,094

UNITED STATES PATENT OFFICE

JOSEF V. PACHER, OF BROOKLYN, NEW YORK, ASSIGNOR TO INTERNATIONAL POSTAL SUPPLY COMPANY, OF BROOKLYN, NEW YORK

FUEL-SUPPLY APPARATUS

Application filed March 22, 1930. Serial No. 437,970.

This invention relates to an apparatus for us in connection with feeding fuel to an internal combustion engine, and the apparatus is generally known to the trade as a vacuum tank, which is utilized as a medium for passing fuel from the main supply tank to the carburetor.

Heretofore, various designs of vacuum tanks have been proposed and used, one of which being that shown and described in Patent 1,708,535, issued April 9, 1929, to Michael Csapayi and Richard Curda.

It is the object of my present invention to improve on the apparatus shown and described in the above-mentioned patent. My improvement resides particularly in the construction and operation of the air-control valve and the parts directly associated therewith.

My invention will be readily understood by reference to the annexed drawing, wherein:

Figure 1 is a part-sectional and part-elevational view through the fuel supply apparatus.

Figure 2 is a view of the valve mechanism, similar to that shown in Figure 1, but in a different position of operation.

Figure 3 is a sectional view on the line 3—3 of Figure 4.

Figure 4 is a plan view of a spring member used in connection with the valve mechanism.

In order to make my improvement readily understood, I will describe briefly the complete apparatus and then more in detail the features to which my improvements are directed.

In the drawing, 1 is the main receptacle having a fitting 2 adapted to be connected to a conduit or pipe leading to the carburetor. Preferably, a valve 3 is positioned as shown in order to shut off the flow of liquid fuel to the carburetor if desired. Spaced from the inner wall of the main receptacle 1 is an auxiliary receptacle 4. This latter receptacle is considerably shorter than the main receptacle 1, and is provided with a valve 5 for controlling an opening into the main receptacle 1. The auxiliary receptacle 4 is so constructed that when the valve 5 opens, the liquid fuel in the auxiliary receptacle is quickly passed into the main receptacle 1. The main fuel tank in an automotive vehicle is adapted to be connected to the auxiliary receptacle by means of the intake pipe 6 which is positioned in a cover 7 that serves to cover the outer opening of both of the main and auxiliary receptacles 1 and 4. This attachment means may be provided in any satisfactory way as by means of a clamping ring 8 and a plurality of screws 9.

The cover 7 is provided with a hollow extension 10, and within the hollow portion of the extension 10 is positioned the stem 11 of a float 12 located within the auxiliary receptacle 4. The upper end of the stem 11 terminates in a pair of collars 13 and 14, while the lower part of the stem near the float 12, is provided with an imperforate disc 15 which seals off the stem at this point. A hole 16 is provided in the wall of the stem 11, closely adjacent the disc 15; also, the stem is provided with a slot 17 within which is positioned the end of the screw 18 carried in the extension 10. The end of the screw 18, working in the slot 17, limits the up and down movement of the stem 11 and the float 12, and also prevents the stem 11 and the float 12 from turning around, which is advantageous when the stem 11 is made circular.

Preferably, the upper end of the extension 10 is threaded to receive the threaded end of a cap 19 which assists in holding a valve seat 20 in position. On the valve seat 20, is positioned a ball-valve 21 having a lower pin 22 extending downwardly into cooperative relationship with the collars 13 and 14. The pin 22 has a sliding fit in the collar 13 and a reduced portion 23 adapted to work in a hole in the collar 14. The end of the pin 22, adjacent the reduced portion 23, has an enlargement 24 or the equivalent thereof to engage the bottom side of the collar 14 so as to prevent the pin 22 from being withdrawn through the said collar.

In the form shown, the enlarged end 24 is in the form of threads which may be screwed through a corresponding threaded hole in the collar 14, but when the pin 22 is moved up and down, as will be later described, the end 24 will not slide through the collar 14.

Extending upwardly from the ball-valve 21, from a point diametrically opposite the pin 22, is another pin 25. The pin 25 carries a double- conically-shaped member 26 which works in cooperation with a plurality of spring arms 27 carried on a member 28. The member 28 has a nipple 29 which passes through a hole in the end or bottom of the cap 19, after which it is spun over as indicated at 30. The nipple 29 therefore serves to hold the member 28 in position in the cap and also serves as a guide for the end of the pin 25. The cap 19 is provided with at least one air orifice 31.

The extension 10 is provided with an enlargement 32 for the purpose of attaching a conduit or pipe readily to the intake manifold of the engine, and a port opening 33 is provided so that the engine can apply suction through the port opening 33 to the interior of the auxiliary receptacle 4 by way of holes 34 and 35 in the collars 13 and 14 and the hole 16. Arranged adjacent the hole 16, is a recess 36 in the cover 7, so that the interior of the stem 10 is always in operative connection with the interior of the receptacle 4.

The operation of my improved form of air-control valve will be readily understood by the following brief description of the operation of the vacuum tank.

In the position shown in Figure 1, the valve 21 is against its seat 20 and the suction applied to the port 33 withdraws the air from the auxiliary receptacle 4, and due to this vacuum, the liquid fuel is brought over from the main tank to the auxiliary receptacle 4. This action raises the float 12 and the stem 11 until the end of the pin 22 engages the collar 14 as shown in Figure 2, so that further raising of the float 12 lifts the ball 21 from its seat; and due to the action of the spring fingers 27, acting in cooperation with the double conically-shaped member 26, the valve 21 is immediately carried to the position shown in Figure 2 where it is held by the spring fingers 27. At the same time, the end of the screw 18, acting in the slot 17, prevents the float 12 from raising any further. This action now opens the air port 31 to the auxiliary chamber 4 through the medium of the holes 34 and 35 and the hole 16 and recess 36, thereby establishing atmospheric pressure in the auxiliary receptacle 4. The weight of the fluid therein immediately opens valve 5 and the content of the receptacle 4 is discharged into the main receptacle 1, air being forced out of the tank 1 through an air vent 37, and the float 12 immediately falls, bringing the valve 21 back to its seat by reason of the enlargement 24 or equivalent means engaging the inner collar 14, and the cycle of operation is then ready to be repeated.

In this apparatus, it will be noted that the suction connection through the auxiliary tank 4 is a continuous one and the only valve in the apparatus is the ball-valve described, the action of which has been made a very positive one by reason of the construction herein described.

While I have shown my air valve mechanism in association with the vacuum tank having concentrically arranged inner and outer chambers, it may be used with other styles of vacuum tanks, and I therefore do not wish to be limited in this respect.

Having thus described my invention, what I claim is:

1. A fuel supply apparatus including; a main receptacle having a discharge outlet therefrom and having a free air opening near its upper edge, an auxiliary receptacle positioned within and spaced from the sides of said main receptacle with a fuel inlet thereto, said auxiliary receptacle being shorter than the main receptacle and having an opening in the bottom for quickly discharging its contents in said main receptacle, and a valve for controlling said discharge opening; a cover for both of said receptacles, said cover having a hollow extension, a float in said auxiliary receptacle and having a hollow stem projecting into and guided in said cover extensions, said stem terminating in a pair of spaced collars, said stem also having an imperforate disc positioned just above the float and further having an opening into the auxiliary receptacle, a valve seat positioned in the upper end of said extension, a ball valve to fit said seat, said ball having pins extending from diametrically opposite sides thereof, the lower pin having a guiding fit in the outer of said spaced collars on the float stem, and having a reduced part passing through a hole in the second collar, means for preventing said reduced portion of the pin from being pulled through said second collar, said collars having holes therethrough other than those for said pin, a cap fitting the upper part of said extension, a member having a plurality of spring arms carried by said cap, the upper of said pins carrying a double cone-shaped device against which the free ends of said spring arms engage, said cap having at least one air opening, a port opening into said hollow extension below said valve seat and above the upper limit of movement of said float stem, said port opening adapted to be continuously connected into operative relation to a suction pipe.

2. A fuel supply apparatus including a vacuum tank having a chamber with a fuel inlet thereto, and another chamber having an air inlet above the level of fuel therein having a discharge outlet therefrom, a valve controlling an opening from the first chamber into the second-mentioned chamber and a float in the first chamber; means for introducing air at intervals into the first-mentioned chamber to control the operation of said valve, said means comprising a hollow extension to the tank leading from the first-mentioned chamber, a member within said extension operatively connected with the float, a valve seat positioned in the upper part of said extension, a ball valve to fit said seat, said ball having pins extending from diametrically opposite sides thereof, said lower pin having an operative connection with said float member, a cap fitting the upper part of said extension, a member having a plurality of spring-arms carried by said cap, the upper of said pins carrying a double cone-shaped device against which the free ends of said spring-arms engage, said cap having at least one air opening, a port opening into said hollow extension below said valve seat and adapted to be connected continuously to a suction pipe, said port opening also being continuously connected to said first-mentioned chamber, through the hollow extension.

3. A fuel supply apparatus as set forth in claim 2, further characterized in that said member having the spring-arms has a nipple which passes through the end of said cap for fastening said member to the cap, said nipple acting as a guide for the upper of said pins.

4. A fuel supply apparatus as set forth in claim 2, further characterized in that the spring-arms are arcuately spaced 120° so as to get substantially uniform pressure on the double conically-shaped device as and for the purposes described.

5. A fuel supply apparatus as set forth in claim 2, further characterized in that the hollow part of said extension is circular and likewise said float member, and means for preventing said member from turning and also limiting the amount of up and down movement of the member and float.

6. A fuel supply apparatus as set forth in claim 2, further characterized in that said valve seat is held in place by said cap which is quickly removable and further characterized in that said member having the spring-arms is fastened to the cap so the spring-arms act symmetrically on said double-cone-shaped member to positively hold the ball valve on or off its seat, depending on the position of the float.

7. An air valve mechanism for a vacuum feed tank which utilizes a float for operating said valve, said mechanism including a valve seat and a support therefor, a cap positioned above the seat, a valve member to fit said seat, a pair of pins fastened to and extending diametrically from said member, a double cone-shaped member carried on one of said pins, said pin carrying said double cone-shaped member having a bearing in the bottom of said cap, the other of said pins being operatively connected with the float, resilient means carried by said cap engaging one or the other of said cones to hold the valve member on or off its seat according to its operative position as determined by the float, and at least one air vent into said cap.

In testimony whereof, I affix my signature.

JOSEF V. PACHER.